United States Patent
Holowko

(10) Patent No.: US 6,192,283 B1
(45) Date of Patent: Feb. 20, 2001

(54) METHOD AND APPARATUS FOR ADAPTIVE CONTROL OF A SYSTEM OR DEVICE

(75) Inventor: Paul L. Holowko, Dayton, OH (US)

(73) Assignee: Siemens Energy & Automation, Inc., Alpharetta, GA (US)

(*) Notice: Under 35 U.S.C. 154(b), the term of this patent shall be extended for 0 days.

(21) Appl. No.: 09/127,151

(22) Filed: Jul. 31, 1998

(51) Int. Cl.[7] .................................................. G05B 13/02
(52) U.S. Cl. .............................. 700/28; 700/34; 700/47; 700/200
(58) Field of Search ................................ 700/28, 29, 30, 700/31, 32, 34, 47, 200

(56) References Cited

U.S. PATENT DOCUMENTS

| | | |
|---|---|---|
| T100,804 | 7/1981 | Ernst . |
| 4,094,940 | 6/1978 | Hold . |
| 4,187,542 | 2/1980 | Ball et al. . |
| 4,290,986 | 9/1981 | Koschmann . |
| 4,617,637 | 10/1986 | Chu et al. . |
| 4,669,040 * | 5/1987 | Pettit et al. ......................... 364/162 |
| 4,721,589 | 1/1988 | Harris . |
| 4,883,944 | 11/1989 | Takano et al. . |
| 4,983,336 | 1/1991 | Langlois . |
| 5,016,278 | 5/1991 | Rochette et al. . |
| 5,089,984 * | 2/1992 | Struger et al. ......................... 700/12 |
| 5,130,920 | 7/1992 | Gebo . |
| 5,135,688 | 8/1992 | Nakamura et al. . |
| 5,173,224 | 12/1992 | Nakamura et al. . |
| 5,176,858 | 1/1993 | Tsukabe et al. . |
| 5,301,101 | 4/1994 | MacArthur et al. . |
| 5,350,547 | 9/1994 | Yamaguchi et al. . |
| 5,388,190 | 2/1995 | Nakano . |
| 5,394,322 * | 2/1995 | Hansen ................................ 364/148 |
| 5,482,662 | 1/1996 | Nakamura et al. . |
| 5,486,995 * | 1/1996 | Krist et al. ........................... 364/149 |
| 5,486,998 * | 1/1996 | Corso ................................. 364/152 |
| 5,493,502 | 2/1996 | Niwa . |
| 5,559,720 | 9/1996 | Thompkins et al. . |
| 5,602,966 | 2/1997 | Kinoshita . |
| 5,608,846 | 3/1997 | Mitsubuchi et al. . |

* cited by examiner

Primary Examiner—Dennis M. Butler
(74) Attorney, Agent, or Firm—Dinsmore & Shohl LLP

(57) ABSTRACT

A method and apparatus for adaptively controlling a system parameter, such as the temperature in an injection molding machine. In a preferred arrangement, the current status of the system is obtained by sampling the parameter a number of times and by making calculations based upon the samples taken, and then compared to data stored in a database or look-up table to determine whether the status has been encountered previously. The database also contains data corresponding to previous outputs and previous results obtained for each previous output. If the current status matches a previous status, an output is provided that is proportional to a previous output attempted, the proportion being based upon the response achieved by that previous output. If no match is found, an output is provided that is based upon a predetermined value. After the output is provided, a response to the output is monitored, and the current status, the output, and the response are saved for future use.

30 Claims, 5 Drawing Sheets

METHOD AND APPARATUS FOR ADAPTIVE CONTROL OF A SYSTEM OR DEVICE

TECHNICAL FIELD

This invention relates to methods and devices for controlling a system parameter for machines, such as temperature, position, or pressure, and, more particularly, for adaptively controlling such a parameter by "learning" from previous system conditions and previous outputs, which have been recorded such as in a look-up table or the like, and adjusting the output to the system according to the results obtained from previous outputs.

BACKGROUND OF THE INVENTION

Over the years, a variety of control systems have been developed for controlling the output of machines or for the control of a particular variable in a process or device. For example, it has been known to use computer numerical controls to control the temperature and pressure in an injection molding machine. Such a conventional control system can utilize feedforward and feedback control loops for controlling the variable, the feedforward control being operative for canceling an incoming disturbance, while feedback control is operative for responding to the result of the action which has been taken. The two types of controllers may be combined whereby the feedback controller can compensate for any error remaining after the feedforward action has been taken.

An example of a feedback controller is a PID (proportion, integral, and derivative) controller, a device which creates a control function which is the sum of three terms, one which is proportional to the error signal, one of which is proportional to the integral of the error signal, and one which is proportional to the derivative of the error signal. Implementation of PID control is usually accomplished with analog circuits using RC (resistor and capacitor) networks and active filters. Alternatively, software may be utilized to simulate the functioning of the PID controller.

While conventional control systems are adequate for controlling certain systems and devices, such control systems have several disadvantages. For example, conventional control systems have been inadequate for providing extremely precise or "tight" regulation of output and, thus, have produced unacceptable levels of overshoot or undershoot of the controlled variable. Moreover, conventional control systems need to be tuned at setup to properly control the system or device and, because the response of a system or device may change over time, such control systems need to be periodically tuned to account for such changes in response. For example, once the gains of a PID controller are set, they will generally not adapt to changes in the controlled system as parts break in or as parts are replaced, and the user must periodically "tweak" the gains to account for such changes. In addition, the cost of conventional controllers, such as PID controllers, can be high.

Control systems have been developed which adjust to changes in the system or device over time. For example, U.S. Pat. No. 5,130,920, issued to Gebo, discloses a control system for the control of temperature, such as the temperature of a liquid in a process, through the use of a feedforward processor, a feedback processor, and an adaptive (or tuning) processor. The adaptive processor receives the outputs of the feedback and feedforward processors and adjusts them, if the actual temperature is outside of a certain range, by multiplying the outputs by a tuning constant, which is calculated based upon the outputs of the feedback and feedforward processors. The adaptation process continues on each iteration until the output from the feedback controller is reduced to zero, in order to maximize feedforward controller tuning.

It has also been known to utilize fuzzy logic to control complicated devices that include non-linear elements, and to alter the fuzzy membership functions utilized when the results of the fuzzy logic differ from desired values. U.S. Pat. No. 5,602,966, issued to Kinoshita, discloses a method and device for modeling fuzzy membership functions for use in control of a device. The invention permits automatic incremental alteration of the membership function either by shifting the function or changing its shape until the results of the inference rules obtain a desired value. The inference rules take the form of "If . . . Then" statements, and the membership functions are variables that may comprise a number of levels, such as high, medium, or low, based upon the precise numerical value of the variable. If the inference result obtained through the inference rules does not satisfy a permissible range of predetermined target inference results, the membership functions are altered by a predetermined amount. The altered membership functions and rules are then used to obtain a control variable that is used to control the controlled object.

U.S. Pat. No. 5,135,688, issued to Nakamura et al., also discloses the use of fuzzy logic for controlling a device including a fuzzy inference control method for an injection molding machine. The method contemplates use of the fuzzy inference to define a control value by inferring the status of the machine based upon the difference between the object temperature and the current temperature, as well as the temperatures of parts located between thermocontrolled components. An actual control value is calculated based upon the fuzzy inference, and the temperature of the machine is controlled using the actual control value.

While the use of the methods and systems disclosed by these references can have certain advantages in controlling a system or device, such methods and systems are not without disadvantages. Generally, such processes can be time-consuming, relatively complex to produce, and result in significant overshoot and undershoot of the desired result. Thus, a more simple and efficient method would be desirable, such as a method in which prior system outputs are recorded in a database or buffer, along with the response obtained from these prior outputs, and this recorded data is used to adapt or adjust future outputs to the system. None of these references disclose or suggest such a process.

Thus, there is a continued need for a more efficient adaptive control system that eliminates the need for conventional control devices, as well as the periodic tuning of such devices, and that quickly and accurately controls the system or device with minimal overshoot and undershoot.

SUMMARY OF THE INVENTION

It is an object of the present invention to provide a control method and apparatus that eliminates the need for periodic tuning of control devices.

It is another object of the present invention to provide a control method and apparatus that is simpler and less expensive to implement than conventional control systems.

It is yet another object of the present invention to provide a control method and apparatus that virtually eliminates overshoot and undershoot of the desired system parameter setting, and, thereby, provides tight control over the parameter.

Another object of the present invention is to provide a control method and apparatus that stores prior control values and the results obtained from such values, and adjusts future control value based upon the past results, thereby "learning" from or "adapting" to prior attempts or cycles.

A further object of the present invention is to provide a control method and apparatus that can be utilized to control a variety of system parameters and variables.

To achieve the foregoing and other objects, and in accordance with the purposes of the present invention as described above, a method for controlling a system parameter is provided comprising the steps of monitoring a current system status, accessing a data structure having data locations for at least one prior system status, and determining whether the current system status matches a prior system status in the data structure. The current system status corresponds to the status of a system to be controlled by the method, and each prior system status corresponds to a previously assessed status of the system. In addition, each prior system status has a corresponding prior output and a corresponding prior result. If the current system status matches a prior system status, a current output is provided that is based upon the prior output corresponding to the matched prior system status, and if the current system status does not match the prior system status, a current output is provided that is based upon a predetermined value. The current output is output to the system for control of the variable parameter.

In accordance with another aspect of the invention, a method is provided for controlling a variable parameter of a system, comprising the steps of providing a setpoint, obtaining a first current value of the variable parameter, calculating an error value equal to the difference between the first current value and the setpoint, selecting a predetermined output based upon the error value, and determining whether the predetermined output has been previously output to the system. If the predetermined output has been previously output, it is adjusted by a predetermined amount and then output to the system, but if the predetermined output has not been previously output to the system, it is not adjusted before being provided to the system. The setpoint corresponds to the desired value of the variable parameter to be controlled.

DETAILED DESCRIPTION OF THE PREFERRED EMBODIMENTS

Figure 1:
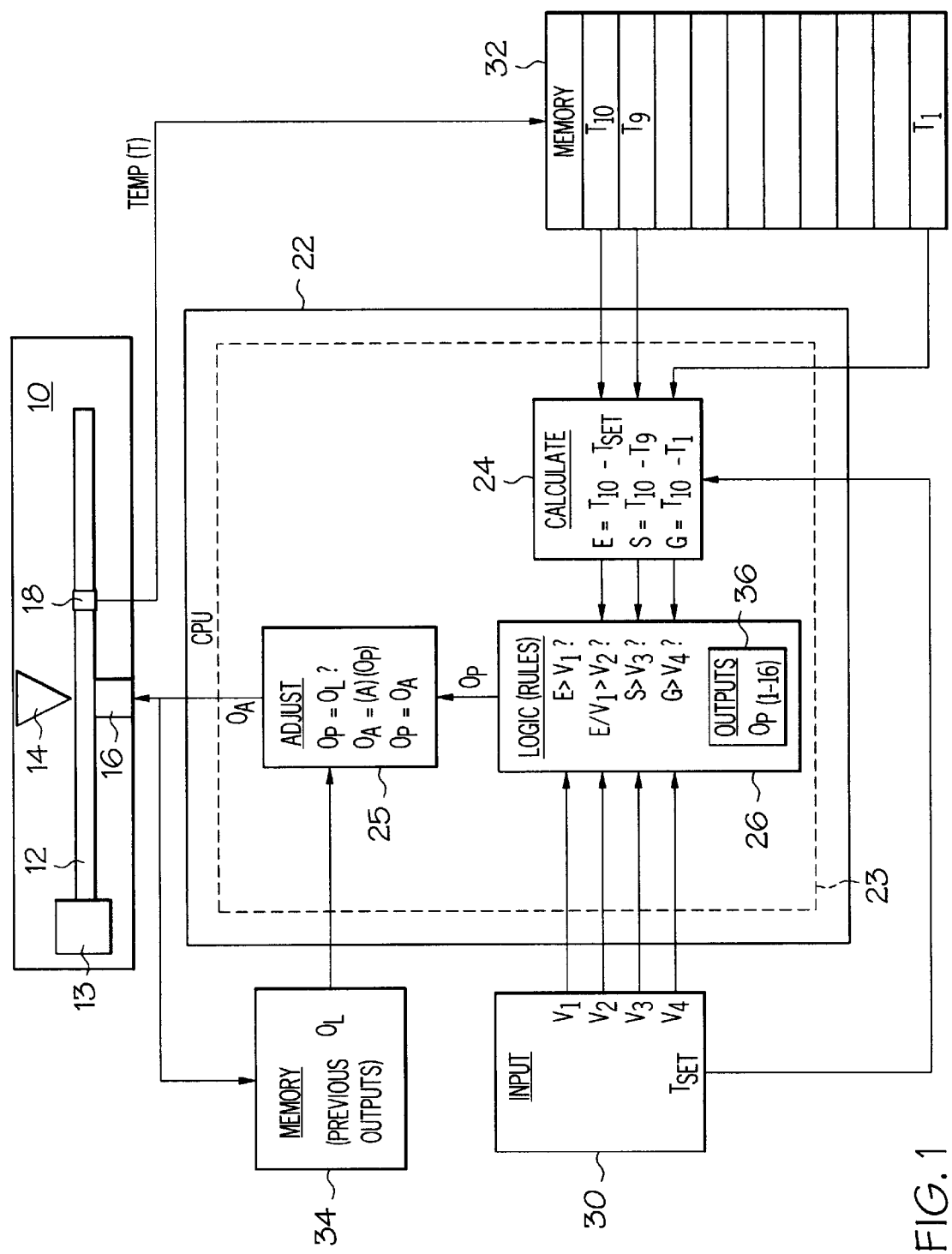
FIG. 1 is a block diagram schematically illustrating an embodiment of the present invention configured to control the temperature in an injection molding machine.

Referring now to the drawings in detail, wherein like numerals indicate the same elements throughout the views, FIG. 1 is a block diagram illustrating an embodiment of the present invention as it might be utilized to control the temperature in an injection molding machine. An injection molding machine 10 has a barrel 12 to which pelletized plastic is delivered through a hopper 14. The barrel 12 is heated by a heating element 16 such that the plastic in the barrel melts and can be injected into a mold cavity 13 where it cools and forms a plastic part. The present invention provides an apparatus and method for controlling the temperature of the barrel 12 such that deformities and/or other inconsistencies in part production due to temperature variation are minimized.

A temperature sensor 18, such as one incorporating a thermistor or thermocouple, can be utilized to monitor the temperature of the barrel 12 during the injection molding process, and the output of the sensor can be fed to a memory unit 32, such as disk or RAM memory, such that the temperature of the barrel can be monitored, or sampled, at various instances over a period of time. As will be described, using this data, along with data input by input unit 30 and previous outputs stored in memory unit 34, CPU 22 can formulate a control output signal for controlling the heating element 16 and, thus, the temperature of the barrel 12. It is preferred that a plurality of (e.g., ten) samples of the temperature are taken and stored before each output is provided to the heater 16, and that one sample is taken per second.

CPU 22 can comprise a microprocessor, computer processor, or similar device capable of performing arithmetic and logic functions. The CPU 22 can execute a program 23 having a calculation function 24 for performing calculations, a logic function 26 for determining a predetermined output to be provided, and an adjustment function 25 for adjusting the predetermined output based upon past experiences and results which are stored in memory. These functions are described in further detail below.

The calculation function 24 of the program 23 preferably receives the temperature samples stored in memory unit 32 and can make a number of calculations, or determinations, based upon the data, as explained below. For example, the amount that the current temperature of the barrel, (saved in memory at $T_{10}$) differs from the preset or desired temperature, (illustrated as input $T_{set}$) can be calculated by subtracting $T_{10}$ from $T_{set}$. This value corresponds to the error of the barrel temperature and is represented in FIG. 1 as E. Similarly, the slope of the temperature curve, illustrated in FIG. 1 as S, can be calculated by subtracting the second-to-last temperature sample taken (e.g. $T_9$) from the last temperature sample taken ($T_{10}$). A general trend (G) of the temperature data stored in memory 32 can also be calculated by subtracting the first sample taken in the cycle, $T_1$, from the last temperature sample taken $T_{10}$.

These calculations are fed to the logic function 26 of the program 23 where they can be used to determine an output to be applied to the heating element 16. The logic function 26 utilizes a series of rules to determine a predetermined output to select, the rules being based upon a number of calculations provided by calculation function 24, and a number of inputs provided by the input unit 30. Preferably, a series of predetermined outputs $O_p$ are stored, and the particular output which is provided by the logic function 26 is dependant upon a comparison between the calculations made by the calculation function 24 and the predetermined input tolerances obtained from the input unit 30. These tolerances may be provided by the user using a standard input device, by another program or routine, by a database or table, or can be directly embedded into the program 23 itself. The output $O_p$ that is selected can depend upon a number of factors, such as, for example, whether the error E is greater than a predetermined tolerance value, the magnitude of the error E, the direction of the temperature slope S, and/or the magnitude of the general trend G.

Preferably, and as shown in FIG. 1, in the logic function 26, the error E is compared to an error tolerance $V_1$ to determine whether the error is within or outside of a predetermined tolerance value. The error E can also be divided by the tolerance $V_1$ and this value compared to a magnitude tolerance $V_2$ to determine how large the error E is relative to the tolerance $V_1$. Moreover, as shown in FIG. 1, the slope S can be compared to a value $V_3$ to determine the magnitude or direction of the slope S, and the trend G can be compared to a trend tolerance $V_4$ to determine whether the general trend is within a certain tolerance as defined by $V_4$. (Preferably, $V_3$ is equal to zero such that the comparison of slope S to $V_3$ determines whether the slope S is positive or negative.)

Based upon the results of these four comparisons, a predetermined output $O_p$ is selected and provided to the adjustment function 25. Because four comparisons are utilized in the preferred embodiment of FIG. 1, a minimum of sixteen predetermined outputs $O_p$ must be provided for this embodiment (more if equalities are to be taken into account).

The selected output $O_p$ of the logic function 26 is provided to an adjustment function 25 where it may be adjusted by an amount A depending upon past experiences of the system. More specifically, previous outputs of the system are preferably stored in a memory location (e.g. 34), and are provided to the adjustment function 25 of the program 23, which determines if the selected output $O_p$ has been attempted previously (i.e., is stored in the memory 34). If so, the adjustment function 25 will adjust the output $O_p$ and provide an adjusted output $O_A$. Preferably, the selected output $O_p$ is adjusted by a predetermined amount A if that same selected output was the previous output provided to the heater 16. Thus, if the last output of the program 23 was $O_{p7}$, and the logic function 26 decides that the next output should also be $O_{p7}$, then $O_{p7}$ will be adjusted by a predetermined amount A and the adjusted output $O_A$ fed to the heater 16. The adjustment can be achieved in a number of manners, such as by multiplying by the amount A, dividing by the amount A, adding the amount A, or subtracting the amount A.

However, if the previous output selected does not match the next output selected, then no adjustment will be made. For example, if the last output selected by the logic function 26 is $O_{p7}$ and the next output selected is $O_{p6}$, then no adjustment will be made and $O_A$ will equal $O_{p6}$. In this manner, any predetermined output $O_p$ that is selected twice in a row will be adjusted by an amount A so that it is increased or decreased, as explained more fully below. The next time that adjusted output is selected, it will reflect the change. Thus, the system can "learn" from previous outputs and "adapt" future outputs accordingly.

The predetermined outputs $O_p$, as well as the adjusted outputs $O_A$, preferably correspond to trigger signals, such as pulse width modulated (PWM) trigger signals, which pulse on the heater 16 for a certain amount of time depending upon the magnitude of the output. At initialization of the program 23, all outputs $O_p$ may be set to a predetermined magnitude, and, as the program is run, certain outputs $O_p$ may be either increased or decreased in magnitude, according to the operation of the adjustment function 25.

The exemplary system of FIG. 1 preferably operates as follows. At initialization of the program 23, all outputs $O_p$ are set equal to a value of fifty, such that when a particular output is provided, the heater will be pulsed on for fifty per cent of the measurement cycle, which, as noted above, is preferably ten seconds in length. During those ten seconds, the temperature sensor 18 will provide ten temperature measurements to memory 32. Based upon those ten measurements, the calculation function 24 will calculate three values (E, S, and G) and feed those values to the logic function 26 which determines the output $O_p$ to select by comparing the values to the tolerances obtained from the input unit 30, such as through the use of IF . . . THEN statements, logic devices, or the like.

As an example, assume that an output $O_{p7}$ is selected based upon the inputs to the logic function 26. The output $O_{p7}$ is fed to the adjustment function 25 which determines if $O_{p7}$ was the last output $O_L$ of the device. If so, the adjustment function 25 adjusts $O_{p7}$ by an amount A and provides this adjusted output $O_A$ to the heater 16. The adjustment function 25 also changes the selected output $O_{p7}$ to be equal to the adjusted output $O_A$ such that, the next time that $O_{p7}$ is selected, it will reflect the adjustment.

It is preferred that the adjustment amount is equal to 3/2 or 2/3 depending upon the particular output $O_p$ selected by the logic function 26, such that the output may be increased by 3/2 or decreased by 2/3 when it is determined by the adjustment function 25 to do so. It is even more preferred that the adjustment amount A be equal to 3/2 when the slope S is negative, indicating that the current temperature is falling, and that the adjustment factor A be equal to 2/3 when the slope S is positive, indicating that the current temperature is rising.

Each time the adjustment is to be made, the adjustment amount A is multiplied by the selected output $O_p$. Thus, if A is equal to 3/2, the first time the adjustment is made to a particular output $O_p$, the output is increased by 3/2 its original value, the second time the adjustment is made, the output increases by 3/2 times 3/2 (i.e., 9/4) its original value, and so on, such that an exponential type of adjustment is made.

While it is preferred that the present invention utilizes logic determinations, calculations, and adjustments such as depicted in FIG. 1 to determine the output provided to heater 16, it is to be understood that other determinations, calculations, and adjustments can be utilized without departing from the scope of the invention. For example, the particular cycle in which the injection molding machine 10 is operating (e.g., injection cycle, cool cycle, etc) is another factor which may be utilized to determine the proper output. The program 23 may determine the cycle by receiving a signal from the control system of the machine 10. Alternatively, the cycle can be determined by monitoring the main reductions in temperature of the machine, which can be stored in a sliding window or circular buffer (i.e, a storage site where the most recent data replaces data obtained earlier). Also, the upcoming cycle of the machine 10 may be utilized as another factor, such that if the upcoming cycle is an injection cycle where cool plastic will be added to the barrel 12, the program 23 can provide an increased output to the heater 16. The following formula can be utilized to determine the amount of energy that needs to be added to the system to account for the incoming plastic in an injection molding application of the invention:

Calories=mass of system*change in temperature. This information can be stored in a sliding window database and used to determine the output of the program 23.

While the program 23 is illustrated in FIG. 1 as comprising three functions, the program is preferably implemented in a programming language, in which the three functions are intermingled in a series of input statements, output statements, decision statements, assignment statements, loops, variables, arrays, and/or other statements and techniques. The program 23 may be implemented in a conventional programming language, such as, for example, C, C++, or Basic, or in a special purpose programming language. Preferably, the program 23 is implemented in C programming language.

Figure 2:
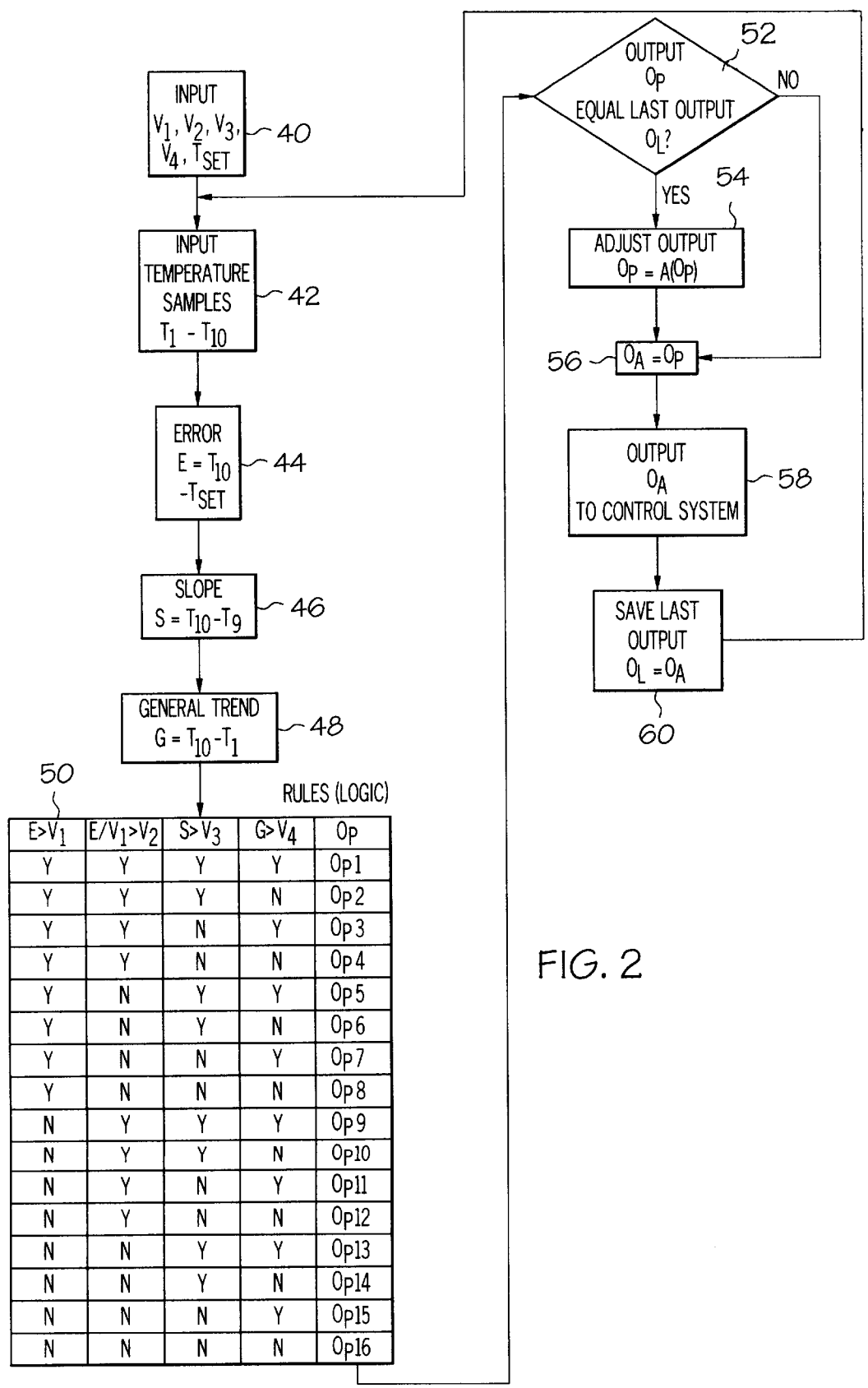
FIG. 2 is a flow diagram illustrating a method for adaptively controlling a system parameter such as can be implemented by the embodiment of FIG. 1.

The flow diagram of FIG. 2 illustrates a preferred embodiment of the method of the present invention, which may be utilized by the program 23 of FIG. 1. At block 40, the various input tolerances, $V_1$ through $V_4$, as well as the desired temperature, $T_{set}$, are input or obtained. A number of temperature samples, $T_1$ through $T_{10}$, are then taken, at block 42, from the device or system to be controlled. From these temperature samples, as well as the desired temperature, the error E, slope S, and general trend G can be determined, at blocks 44, 46, and 48. Using the error E, slope S, and general trend G, a predetermined output $O_p$ can be selected based upon the rules (or logic) contained in block 50. More specifically, at block 50, the error E can be compared to $V_1$, the error E can be divided by $V_1$ and this value compared to $V_2$, the slope S can be compared to $V_3$, and the general trend G can be compared to $V_4$. Based upon the results of these comparisons (a "Y" corresponding to an affirmative answer or a logical 1, and an "N" corresponding to negative answer or logical 0 in block 50), a predetermined output $O_p$ is selected from the possible outputs $O_{p1}$ through $O_{p16}$. As noted above, depending upon the particular application involved, the rules of block 50 may vary significantly from those illustrated in the exemplary method illustrated in FIG. 2 without departing from the scope of the invention.

The particular output $O_p$ chosen for each rule of block 50 can be initially set to a predetermined number or to a random number, because the output will eventually be adjusted by the method if needed. Alternatively, the initial setting for each output $O_{p1}$ through $O_{p16}$ can be determined by energy calculations, which can be determined, for example, from the power rating of the heater as well as the magnitude of the error value E, such that the initial setting for the outputs $O_p$ is as close as possible to the output actually required.

Once the predetermined output $O_p$ is selected through the use of the rules of block 50, the selected output can be adjusted if the output has been stored previously. More specifically, at block 52, if the selected predetermined output $O_p$ is equal to the previous output $O_L$ of the method (output during the previous cycle), the selected predetermined output is adjusted at block 54 by a predetermined amount A. If, however, the selected output $O_p$ was not the previous output of the method, then block 54 is bypassed and no adjustment is made. Block 56 sets the output of the method $O_A$ equal to the selected output $O_p$ and this output $O_A$ is provided to control the temperature of the system or machine at block 58. At block 60, the output $O_A$ is saved as the last output $O_L$ for use during the next cycle of the method. Then, the method is repeated starting at block 42, where another set of temperatures is input.

Other features may be provided in the method of FIG. 2 as well, without departing from the scope of the invention. For example, rules can be provided to take into account instances where the slope S or trend G is equal to zero, or where the current temperature $T_{10}$ exceeds the desired temperature $T_{set}$. In the latter case, the system needs to cool down to reach the desired temperature, and, thus, any output to heating elements can be disabled and/or cooling means, if utilized, can be turned on to begin cooling of the system. The rules of block 50 might also take into account the particular manufacturing cycle of the machine or system that is controlled. Furthermore, the method of FIG. 2 can be utilized to control a number of variable parameters other than temperature, such as pressure and speed, for example, and has applications in a number of machines and processes, such as, for example, machining tools and chemical processing.

The method may also include steps for determining the lag time in the system which is being controlled, i.e., the amount of time it takes from the inputting of a signal to the system, such as heat from a heating element, to the realization of the maximum change in the controlled parameter, such as the temperature of the system. The lag time (also known as the machine duty cycle or response cycle) can then be utilized by the rules of block 50 of FIG. 2, or by the adjustment block 54, to predict or anticipate an appropriate output of the method.

Figure 3:
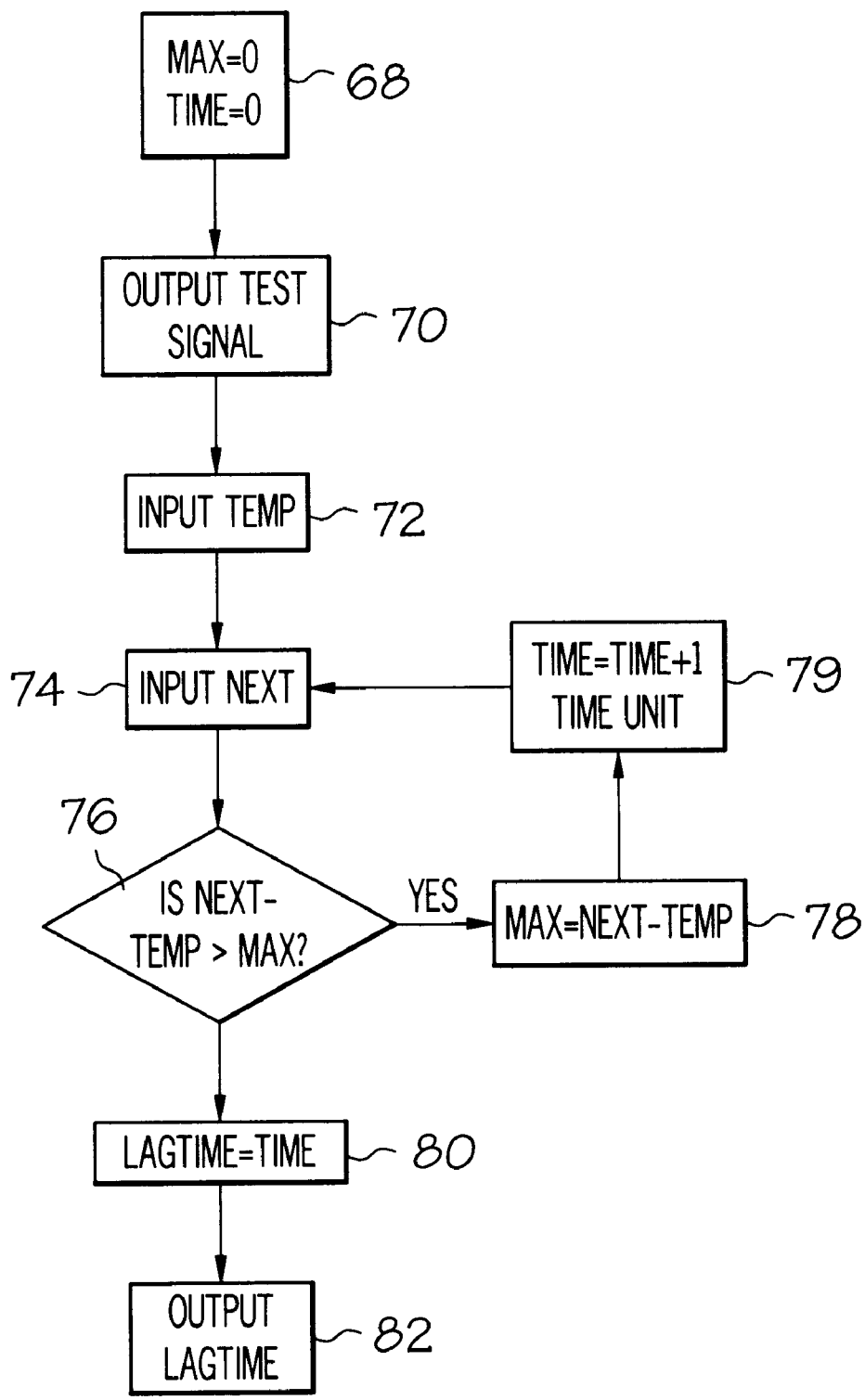
FIG. 3 is a flow diagram illustrating a method for determining the duty cycle of a machine, for use with the method of FIG. 2.

FIG. 3 is a flow diagram illustrating an exemplary method of determining the lag time of the system. As shown, the variables Max and Time are initialized to zero at block 68. Then, at block 70, a test signal is applied to the heater, the signal preferably comprising a trigger signal equal to the value of 100 such that the heater is kept on for the entire duration of the cycle. When this signal is applied, block 72 is executed wherein the temperature (Temp) is monitored and input, so that the temperature at the start of the test cycle is recorded. Then, after a lapse of a predetermined amount of time, the temperature of the system is monitored again, at block 74, and this new temperature stored in the variable Next. At block 76, the initial temperature Temp is subtracted from the variable Next, and this value is compared to the variable Max. If Next minus Temp is greater than Max, the temperature is still rising due to the test signal, and block 78 is executed wherein Max is set equal to the difference between Next and Temp. Block 79 is then executed wherein the variable Time is incremented by one time unit (the time between successive temperature monitorings, which is predetermined by the user of the method). Then, after a time unit has elapsed, another temperature sample is taken, at block 74, and the temperature stored in the variable Next. The difference between Next and Temp is again compared to Max, at block 76, and blocks 74, 76, 78, and 79 are repeated until Max is greater than the difference, at which time the maximum effect of the test signal has been realized and the lag time for the system is equal to the variable Time (block 80). At block 82, the lag time can be output, such as to the user of the method or to another program or method such as the method of FIG. 2, where it can be utilized to determine an appropriate output for controlling the system or machine.

The general temperature drops of the system or machine can also be monitored by using the method of FIG. 3. This data may then be used to anticipate future temperature drops and, thus, to increase the output to the heater when it is anticipated that such drops are likely or scheduled to occur. The anticipated temperature drops can be used as a factor in the rules block 50 or the adjustment block 54 of the method of FIG. 2, to determine the output $O_A$ of the method. If the method of FIG. 3 is utilized to determine general temperature changes, a test signal would not be necessary, as the temperatures could be monitored during regular machine operation. Thus, block 70 of FIG. 3 could be bypassed or eliminated.

Figure 4:
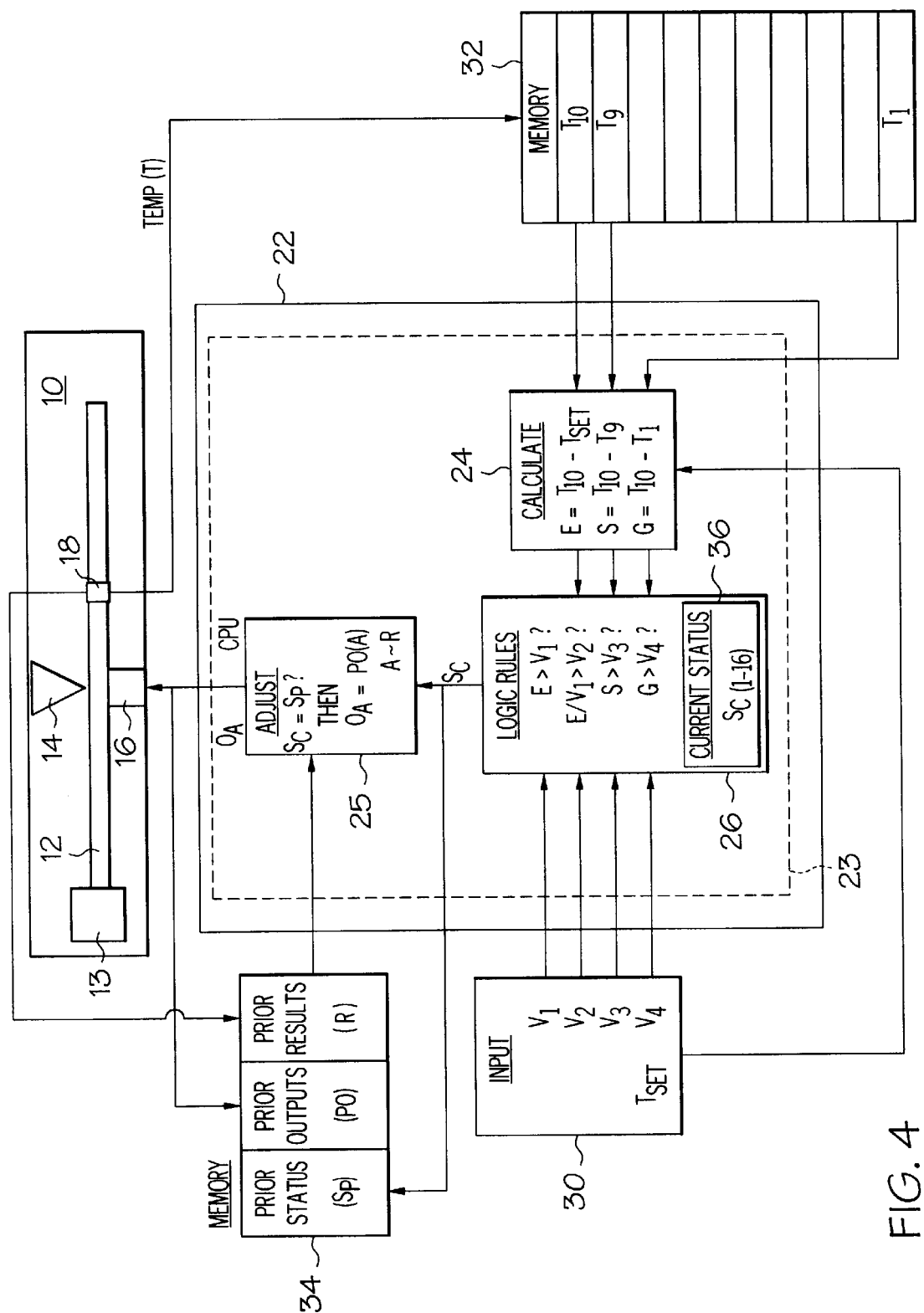
FIG. 4 is a block diagram illustrating an apparatus for controlling the temperature in an injection molding machine, according to another embodiment of the present invention.

In addition to the preferred embodiments discussed above, FIG. 4 illustrates another embodiment of the present invention, wherein previous outputs, along with the results of those outputs, are stored in memory such that the program 23 may "learn" from previous outputs and adjust future outputs accordingly. More specifically, FIG. 4 is similar to the temperature control system depicted in FIG. 1, except that memory unit 34, logic function 26, and adjustment function 25 operate slightly differently. In this embodiment, the rules in the logic function 26 determine the current status $S_c$ of the injection molding machine 10, based upon comparisons of the tolerances received from input unit 30 and the calculations made by calculation function 24. The current status $S_c$ is similar to the predetermined output $O_p$ of FIG. 1, and can be determined by comparing the error E, the slope S, and the general trend G to tolerance values $V_1$ through $V_4$. Generally, the current status $S_c$ indicates the temperature changes which have been occurring in the machine as well as how far the current temperature is away from the desired temperature. However, it is to be understood that the status $S_c$ can comprise a range of values and can be indicative of a number of conditions, depending on the types and number of measurements used to determine the status.

Once the machine status is determined by the logic function 26, the status is fed to adjustment function 25 so that an appropriate output $O_A$ to send to the heater 16 can be determined based upon prior experiences or knowledge stored in memory unit 34. These prior experiences are stored in the form of data in memory unit 34 (or other data structure) and are fed to the adjustment function 25. The data comprises prior machine statuses $S_p$, prior outputs attempted PO, and prior results measured R. Each prior machine status $S_p$ has a corresponding prior output PO that was attempted for that particular status, as well as a corresponding prior result R that corresponds to the machine response to the prior output PO. For example, prior status $S_{p1}$ will have a corresponding prior output $PO_1$ that was attempted when $S_{p1}$ was encountered, as well as a prior result or response $R_1$ that was obtained from the output $PO_1$. The historical data stored in memory 34 can be arranged in a number of ways in order to correlate each prior status to its corresponding prior output and prior result.

The adjustment function 25 compares the current status $S_c$ of the system, obtained from the logic or rules of logic function 26, and determines whether the current status matches a prior status $S_p$ stored in memory 34. If the current status $S_c$ does not match a saved prior status $S_p$, a predetermined output can be selected and provided as the output $O_A$ to the heater 16. If the current status $S_c$ does match a prior system status $S_p$, the prior output PO and prior result R corresponding to the matched prior status are obtained and used to determine the output $O_A$ to the heater 16. The adjustment function 25 adjusts the prior output PO corresponding to the matched prior status $S_p$ by an adjustment factor A, the factor A being dependant upon the prior result R obtained. Thus, for example, if the current status of the injection molding machinee10 is $S_{c9}$, the adjustment function 25 will look in memory 34 to determine if current status $S_{c9}$ had been encountered before. If so (i.e., there is an entry for $S_{p9}$), the adjustment function 25 will adjust prior output $PO_9$ (corresponding to the output attempted for $S_{p9}$) by an amount A, and provide this adjusted output $O_A$ to the heating element 16. The amount A is based upon the result $R_9$ that was achieved from the prior output $PO_9$, and that is also saved in memory unit 34. The result R is obtained by monitoring the machine 10, through sensor 18, after each output is provided to the heater 16. The result R can comprise temperature data measured, error and/or slope values calculated, or the system status $S_c$ obtained.

In one embodiment, the result R is equal to the error in temperature ($T_{set-T20}$) achieved by the prior output PO during the next cycle. In this embodiment, the larger the error, the more the prior output PO will need to be increased by the adjustment factor A. If the error achieved is equal to zero, the prior output achieved the desired temperature without overshoot, and, thus, the adjustment factor should be equal to 1 so that the prior output PO is not adjusted at all, and the same prior output PO is utilized as the output $O_A$ of the program 23 (i.e., whenever the prior output achieved the desired result, that output should be used as is and not adjusted at all). If the error is less than zero, the prior output PO will need to be decreased by the adjustment factor A. The adjusted output is then provided to the heater 16 as output $O_A$. Thus, in this embodiment, the prior output PO selected is adjusted by an adjustment factor A that is directly proportional to the error achieved the last time that the selected prior output PO was attempted.

Prior outputs PO can be obtained by recording in memory 34 the outputs $O_A$ of the adjustment function 25. Similarly, prior statuses $S_p$ can be obtained by recording in memory 34 current statuses $S_c$ fed from the logic function 26.

The embodiment of FIG. 4 operates as follows. For each cycle of operation, the temperature of the barrel is measured a number of times. For example, for a ten second cycle, ten temperature measurements $T_1$ through $T_{10}$ can be taken and stored in memory 32. At the end of the cycle, the calculation function obtains and uses the temperature measurements to make certain calculations, such as error E, slope S, and general trend G. Using these calculations and inputs from the input unit 30, the logic function 26 applies rules to determine or infer the status of the machine and outputs this status $S_c$. The adjustment function 25 compares the status $S_c$ to prior statuses $S_p$ stored in memory 34, and if there is a match, provides an output $O_A$ that is proportional to the prior output PO corresponding to the matched status $S_p$, the magnitude of the proportion being determined by the results R obtained by that prior output PO. The current status $S_c$ is then saved as a prior status in array $S_p$ in memory 34, and the output $O_A$ is saved in the prior output PO array. Then, at the end of the next cycle, or some other predetermined period of time, the results of the output $O_A$ can be determined, through temperature data taken from the temperature sensor 18, and the results R stored in memory 34. Thus, each status is saved, along with the corresponding output attempted for that status and the corresponding machine response to the attempted output. This data is used by the program 23 to "learn" from past responses of the machine and "adapt" future outputs according to the past responses.

Figure 5:
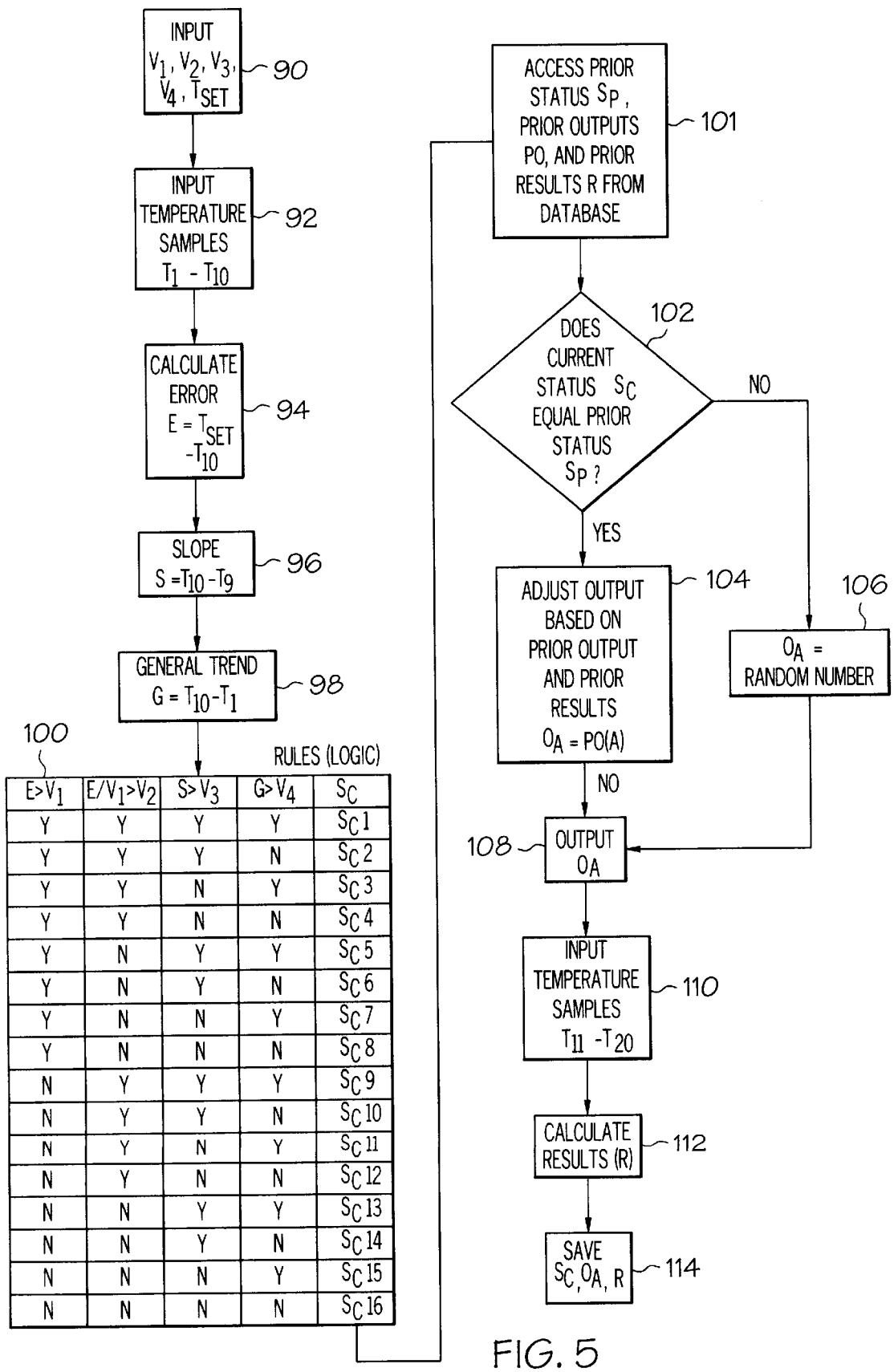
FIG. 5 is a flow diagram illustrating a method for adaptively controlling a system parameter, which can be implemented by the embodiment of FIG. 4.

FIG. 5 is a flow diagram illustrating another preferred embodiment of the method of the present invention, such as may be utilized by the program 23 of FIG. 4. At block 90, the tolerances $V_1$ through $V_4$ as well as the desired temperature $T_{set}$ are obtained, such as, for example, from an input device or from another program or routine. Then, at block 92, temperature samples are taken from the machine or system to be monitored at a number of predetermined intervals, such as, for example, every second for ten seconds. The error E is calculated at block 94 by subtracting the desired temperature the current temperature $T_{10}$ (i.e., the most recent temperature sample taken) from the desired temperature $T_{set}$. Slope S can then be calculated at block 96 by subtracting the second most recent temperature sample $T_9$ from the most recent temperature sample $T_{10}$. At block 98, a general trend G can be calculated by subtracting the first temperature sample $T_1$ from the most recent temperature sample $T_{10}$.

Using the calculations made at blocks 94, 96, and 98, logic block 100 utilizes rules, such as fuzzy logic rules, for example, to determine the current status $S_c$ of the system or machine being controlled. To determine the current status, the error E can be compared to a tolerance value $V_1$, the normalized error (E divided by the tolerance $V_1$) can be compared to a tolerance value $V_2$, the slope S can be compared to a tolerance value $V_3$, and the general trend G can be compared to another tolerance value $V_4$. From the comparisons, a status, such as $S_{c1}$, or $S_{c8}$, can be determined. Depending on the particular machine and application involved, it should be understood that other and/or additional rules, calculations, and tolerances may be utilized to determine the current status without departing from the scope of the invention.

Once the status $S_c$ has been determined, block 101 is executed wherein the method accesses a memory device or database containing prior statuses $S_p$ of the system, along with prior outputs PO and prior results R. At decision box 102, the current status $S_c$ is compared to a database wherein prior statuses $S_p$ of the system have been saved. If the current status $S_c$ matches a prior status $S_p$, the output of the method $O_A$ is determined at block 104 by adjusting the prior output PO that was attempted when the matched prior status $S_c$ was encountered, based upon the results R that were achieved by that prior output PO. The prior output PO and the results R corresponding to the matched prior $S_p$, can be saved in the database in any manner known or developed in the art to relate the three pieces of data, such as by indexing or by physical data arrangement.

The results R are determined at a point in time after the prior output PO has been attempted, and can comprise any number of measurements and/or comparisons. For example, the rules of block 100 could be used to determine the results R. Alternatively, the error E alone could comprise the results R. Regardless of the type of results that are chosen, the output $O_A$ is set equal to the prior output attempted PO for the current status of the machine, multiplied by an adjustment factor A that is based upon the results R. If no match is found for the current status $S_c$, the output of the method $O_A$ can be set equal to a random number such as at block 106, (or alternatively, to predetermined number). Whether or not there has been a match, the output $O_A$ is then provided by the method at block 108.

The response of the system or method to the output $O_A$ is then monitored at block 110, such as, for example, by monitoring the next ten temperature samples $T_{11}$ through $T_{20}$. Based upon these temperature samples, results R of the output $O_A$ can be calculated, at block 112. The temperatures monitored at block 110 can also be used as the temperature samples $T_1$ through $T_{10}$, at block 92, for determining the next output of the method during the next cycle or iteration. The current status of the system $S_c$, the output $O_A$, and the results R are all saved, at block 114, in a manner that relates the three, so that future iterations of the method can utilize this data to determine the correct output $O_A$ for controlling the system.

As an example of the operation of the method illustrated in FIG. 5, suppose the database containing the historical data contained the following information:

| Prior Statuses $S_p$ | Prior Outputs PO | Prior Results R |
| --- | --- | --- |
| 4 | 50 | 4 |
| 6 | 55 | 2 |
| 2 | 75 | 3 |

If the current status $S_c$ of the system was determined to be equal to status 6, the method would access the historical data and recognize that a status of 6 was encountered previously. The prior output PO attempted for that status was 55 and the prior result R realized was 2 (this result of 2 corresponds to an error of 2 degrees obtained by the prior output of 55). The method would then calculate an output by changing the output 55 by an adjustment factor A that is dependent upon the result 2. If the adjustment factor was a formula, such as, for example, A=(1+R/5), the adjustment factor A would be equal to 1.4. This amount could be multiplied by the prior output PO, to obtain the output of the method $O_A$, in which case the output $O_A$ would be equal to 55 times 1.4, or 77. This could represent a length of time to pulse on a heater, such as 77 percent of the maximum run cycle for the heater in the injection molding machine example discussed above. The method would output this adjusted output to the heater for control of the temperature.

The method would then monitor the response of the system to this output. For example, the response might be determined to be equal to 1. This data (i.e., the current status of 6, the output of 77, and the response of 1) would then be saved in the memory unit and the updated database would appear as follows:

| Prior Statuses $S_p$ | Prior Outputs PO | Prior Results R |
| --- | --- | --- |
| 4 | 50 | 4 |
| 6 | 55 | 2 |
| 2 | 75 | 3 |
| 6 | 77 | 1 |

Alternatively, the new data entry could overwrite the old data entry for the matched prior status, in which case the updated database would appear as follows:

| Prior Statuses $S_p$ | Prior Outputs PO | Prior Results R |
| --- | --- | --- |
| 4 | 50 | 4 |
| 6 | 77 | 1 |
| 2 | 75 | 3 |

If, on the other hand, there was no match for the current status $S_c$ of 6, then the method could use a random number or predetermined number, such as, for example, 50, for the output of the method $O_A$. After this output is provided, the response of the system to this output would then be monitored and the current status 6, output 50, and the response would be recorded in the database for later use.

The method of FIG. 5 is preferably embodied in a "C" language computer program, that utilizes input statements, output statements, decision statements, assignment statements, loops, variables, arrays, and/or other statements and techniques known in the art. As can be understood by the comparison of the methods of FIG. 2 and FIG. 5, such programs may take on a number of forms, utilize a variety of variable names and commands, and be implemented in any of a number of programming languages, without departing from the scope of the invention. Furthermore, the steps of the method of the present invention may be practiced in a number of orders, without departing from the scope of the invention.

The method may also utilize security factors or confidence factors to determine the amount A that the output should be adjusted, without departing from the scope of the invention. Each time a prior output PO reaches the desired temperature without overshoot, the security factor could be incremented by one. Thus, the higher the security factor, the greater the chance that the prior output PO would be effective in achieving the desired temperature. As noted above, manufacturing duty cycles and input lag times might also be recorded in the database and taken into account for the adjustment factor A.

While preferred exemplary embodiments of the present invention have been described, it is to be understood that further adaptions of the invention described herein can be accomplished by appropriate modifications by one of ordinary skill in the art without departing from the scope of the present invention. Accordingly, although preferred configurations of methods and devices embodying the present invention have been described, it is to be understood that these methods and devices may take on a wide variety of configurations and arrangements without departing from the scope of the present invention. Therefore, the scope of the present invention should be considered in terms of the following claims and should not be limited to the details of the structures and methods shown and described in the specification and drawings.

What is claimed is:

1. A computer-implemented method for controlling a variable parameter of a system, comprising the steps of:
    monitoring a current system status, the current system status corresponding to the status of a system;
    accessing a data structure having data locations for at least one prior system status, each prior system status corresponding to a previously assessed status of the system and having a corresponding prior output and a corresponding prior result;
    determining whether the current system status matches a prior system status in the data structure;
    if the current system status does not match a prior system status, providing a current output based upon a predetermined value, wherein the current output is output to the system for control of the variable parameter; and
    if the current system status does match a prior system status, providing a current output that is based upon the prior output corresponding to the matched prior system status, wherein the current output is output to the system for control of the variable parameter.

2. The method as recited in claim 1, further comprising the steps of:
    obtaining a response of the system to the current output; and
    recording the current system status, the current output, and the response in the data structure.

3. The method as recited in claim 1, wherein, if the current system status does match a prior system status, the current output is adjusted such that it is proportional to the corresponding prior output and modified by an amount that is related to the prior result corresponding to the matched prior system status.

4. The method as recited in claim 1, wherein the current system status is based upon an error value, wherein the error value corresponds to the difference between a desired value of the variable parameter and an actual value of the variable parameter, and wherein the prior system statuses are based upon previously measured error values.

5. The method as recited in claim 4, wherein the current system status is based upon a slope value, wherein the slope value comprises the difference between a first actual value of the variable parameter and a second actual value of the variable parameter, wherein the second actual value of the system parameter is obtained at a different instance in time than the first actual value, and wherein the prior system statuses are based upon previously measured slope values.

6. The method as recited in claim 1, wherein the variable parameter comprises a temperature in an injection molding machine.

7. The method as recited in claim 1, wherein the steps are repeated.

8. The method as recited in claim 1, further comprising the steps of:
    storing a plurality of prior system statuses, a plurality of prior outputs, and a plurality of results in the data structure, wherein each prior system status has a corresponding prior output and a corresponding prior result, and wherein, if the current system status does match a prior system status, the current output is adjusted such that it is proportional to the prior output corresponding to the matched prior system status and modified by an amount that is related to the prior result corresponding to the matched prior system status.

9. The method as recited in claim 1, wherein the current system status is based upon a machine cycle, and wherein the machine cycle is obtained by the steps of:
    obtaining a plurality of successive values of the variable parameter, wherein each successive value is obtained at a different instance in time than other successive values;
    determining the maximum difference existing between any two of the successive values, wherein the maximum difference exists between a first successive value obtained at a first instance in time and a second successive value obtained at a second instance in time; and
    calculating an amount of time between the first instance in time and the second instance in time, wherein the amount of time is equal to the machine cycle.

10. The method as recited in claim 1, wherein the current output is based upon the amount of energy previously added to the system.

11. A computer-implemented method for controlling a variable parameter of a system, comprising the steps of:
    providing a setpoint, the setpoint corresponding to the desired value of a variable parameter of a system;
    obtaining a first current value of the variable parameter;
    calculating an error value, the error value being equal to the difference between the first current value of the variable and the setpoint;
    selecting a predetermined output based upon the error value;
    determining whether the predetermined output has been previously output to the system;
    if the predetermined output has been previously output to the system, adjusting the predetermined output by a predetermined amount, and providing the adjusted predetermined output to the system; and if the predetermined output has not been previously output to the system, providing the predetermined output to the system.

12. The method as recited in claim 11, further comprising the steps of:

obtaining a second current value of the variable parameter at a different instance in time than the first current value;

calculating a slope value, wherein the slope value is proportional to the difference between the first current value and the second current value; and comparing the slope value to a slope value tolerance, wherein the predetermined output is selected based upon the result of the comparison.

13. The method as recited in claim 11, wherein the selecting step comprises:

comparing the error value to a tolerance value, wherein the predetermined output is selected based upon the result of the comparison.

14. The method as recited in claim 13, wherein the selecting step further comprises:

calculating a ratio equal to the error value divided by the tolerance value; and comparing the ratio to a ratio tolerance value, wherein the predetermined output is selected based upon the result of the comparison.

15. The method as recited in claim 11, wherein the steps are repeated.

16. The method as recited in claim 11, wherein the predetermined output is adjusted by the predetermined amount if the predetermined output is equal to the last output to the system.

17. The method as recited in claim 11, further comprising the step of:

if the predetermined output has been previously output to the system, obtaining a result corresponding to the previous predetermined output, wherein the predetermined amount is proportional to the result.

18. The method as recited in claim 11, further comprising:

determining the response cycle for the system; and adjusting the predetermined output based upon the response cycle.

19. The method as recited in claim 18, wherein the response cycle is determined by the steps of:

providing a test output to the system;

measuring a current value of the variable parameter;

measuring a plurality of successive values of the variable parameter;

determining the maximum difference between the current value and the successive values; and determining an amount of time elapsed between the measuring of the current value and the measuring of the successive value corresponding to the maximum difference, wherein the response cycle corresponds to the amount of time.

20. The method as recited in claim 11 wherein the variable parameter comprises a temperature, wherein the system comprises an injection molding machine, and wherein the predetermined output comprises a temperature command signal.

21. The method as recited in claim 11, wherein the predetermined output comprises pulse width modulated trigger signals.

22. A computer readable medium having encoded thereon a computer-implemented method for controlling a variable parameter of a system, the method comprising the steps of:

providing a setpoint, the setpoint corresponding to the desired value of a variable parameter of a system;

obtaining a first current value of the variable parameter;

calculating an error value, the error value being equal to the difference between the first current value of the variable and the setpoint;

selecting a predetermined output based upon the error value;

determining whether the predetermined output has been previously output to the system;

if the predetermined output has been previously output to the system, adjusting the predetermined output by a predetermined amount, and providing the adjusted predetermined output to the system; and if the predetermined output has not been previously output to the system, providing the predetermined output to the system.

23. The computer readable medium as recited in claim 22, wherein the predetermined output is adjusted by the predetermined amount if the predetermined output was the last output to the system.

24. The computer readable medium as recited in claim 22, wherein the method further comprises the step of:

if the predetermined output has been previously output to the system, obtaining a result corresponding to the previous predetermined output, wherein the predetermined amount is proportional to the result.

25. The computer readable medium as recited in claim 22, wherein the method further comprises the steps of:

obtaining a second current value of the variable parameter at a different instance in time than the first current value; and calculating a slope value, wherein the slope value is proportional to the difference between the first current value and the second current value, and wherein the predetermined output is selected based upon the slope value.

26. The computer readable medium as recited in claim 22, wherein the variable parameter comprises a temperature, wherein the system comprises an injection molding machine, and wherein the predetermined output comprises a temperature command signal.

27. A system for controlling a variable parameter, comprising:

a first memory device for receiving values of a variable parameter from a monitor and for storing the values;

a logic device for receiving the values from the first memory device and for determining a current status based upon the values;

a second memory device for storing previous statuses, previous outputs, and previous results, each previous status having a corresponding previous output and a corresponding previous result; and an adjustment device for receiving the current status from the logic device and previous statuses from the second memory device, and for providing an output, wherein the output is equivalent to a predetermined value when the current status does not match a previous status, and wherein the output is proportional to a previous output when the current status does match a previous status, the proportion being based upon the result corresponding to the matched previous status.

28. The system as recited in claim 27, further comprising an injection molding machine, wherein the variable parameter comprises a temperature in the machine.

29. The system as recited in claim 27, wherein the logic device and adjustment device comprise a microprocessor.

30. The system as recited in claim 27, wherein the first memory device and second memory device comprise a random access memory element.

* * * * *